(12) United States Patent
Philipp

(10) Patent No.: US 7,932,203 B2
(45) Date of Patent: Apr. 26, 2011

(54) METHOD FOR PRODUCING AN OIL-BINDING AGENT AND OIL-BINDING AGENT PRODUCED ACCORDING TO THE METHOD

(75) Inventor: Franz Josef Philipp, Mattersburg (AT)

(73) Assignee: Commerzialbank Mattersburg im Burgenland AG, Mattersburg (AT)

( * ) Notice: Subject to any disclaimer, the term of this patent is extended or adjusted under 35 U.S.C. 154(b) by 352 days.

(21) Appl. No.: 12/162,145

(22) PCT Filed: Jan. 22, 2007

(86) PCT No.: PCT/AT2007/000024
§ 371 (c)(1),
(2), (4) Date: Oct. 29, 2008

(87) PCT Pub. No.: WO2007/085031
PCT Pub. Date: Aug. 2, 2007

(65) Prior Publication Data
US 2009/0203514 A1 Aug. 13, 2009

(30) Foreign Application Priority Data
Jan. 25, 2006 (AT) ..................... 110/2006

(51) Int. Cl.
*C04B 33/00* (2006.01)
*C04B 35/00* (2006.01)
*C01B 33/20* (2006.01)
*C01B 33/26* (2006.01)
*C01B 33/24* (2006.01)
*C01B 33/32* (2006.01)
*B01J 21/16* (2006.01)

(52) U.S. Cl. ..... 501/155; 501/141; 501/154; 106/137.1; 106/137.71; 106/164.51; 502/80; 423/326; 423/327.1; 423/328.1; 423/331; 423/332

(58) Field of Classification Search .................. 501/154, 501/155, 141; 502/80; 106/137.1, 137.71, 106/164.51; 423/326, 327.1, 328.1, 331, 332
See application file for complete search history.

(56) References Cited

U.S. PATENT DOCUMENTS

| | | | | |
|---|---|---|---|---|
| 4,872,993 A | * | 10/1989 | Harrison | ........................ 210/666 |
| 5,268,131 A | * | 12/1993 | Harrison | ........................ 264/44 |
| 6,074,967 A | * | 6/2000 | Erskine | .......................... 501/27 |
| 6,451,722 B1 | * | 9/2002 | Kim | ................................ 501/155 |
| 6,962,616 B1 | | 11/2005 | Bandosz et al. | ................. 95/129 |

FOREIGN PATENT DOCUMENTS

| | | |
|---|---|---|
| DE | 2850624 | 6/1980 |
| DE | 3430731 | 3/1986 |
| DE | 3728812 | 10/1988 |
| DE | 3908172 | 9/1990 |
| DE | 4117916 | 12/1992 |
| EP | 035605 | 2/1990 |
| EP | 1681331 | 7/2006 |
| JP | 61000284 | 1/1986 |
| JP | 7018290 | 1/1995 |
| WO | WO-9505072 | 2/1995 |

* cited by examiner

*Primary Examiner* — David M. Brunsman
*Assistant Examiner* — Kevin M Johnson
(74) *Attorney, Agent, or Firm* — Jonathan Myers; Andrew Wilford

(57) ABSTRACT

A method for producing an oil-binding agent of granular open-porous structure with a silicate ceramic matrix by using recovered paper material and clay. The method is characterized in that, in each case based on the entire raw material, 35 to 60 wt.-% sewage sludge with a water content of between 70 and 85 wt.-%, 25 to 55 wt.-% recovered paper material with a water content of between 35 and 55 wt.-%, 10 to 25 wt.-% clay and optionally 1 to 3 wt.-% zeolite, 1 to 2 wt.-% quicklime and/or up to 3 wt. % fly ash are mixed to a homogeneous mixture. The raw material thus obtained is subsequently processed in order to form particles having an average diameter of 4 to 6 mm. The particles are then dried and subsequently burnt at 950 to 1050° C. The oil-binding agents produced according to said method have a bulk density of between 0.4 and 0.75 kg/l and a oil-binding capability of 0.7 to 1.0 l oil per oil-binder.

10 Claims, No Drawings

METHOD FOR PRODUCING AN OIL-BINDING AGENT AND OIL-BINDING AGENT PRODUCED ACCORDING TO THE METHOD

CROSS REFERENCE TO RELATED APPLICATIONS

This application is the US national phase of PCT application PCT/AT2007/000024, filed 22 Jan. 2007, published 2 Aug. 2007 as WO 2007/085031, and claiming the priority of Austrian patent application A110/2006 itself filed 25 Jan. 2006, whose entire disclosures are herewith incorporated by reference.

The invention relates to a method of producing an oil-binding agent of granular, open-porous structure having a silicate-ceramic matrix by using recovered paper material and clay in the raw mixture as well as an oil-binding agent produced according to the method.

A number of different oil-binding agents are known in practice that are composed of or produced from inorganic or even organic material. Oil-binding agents composed of inorganic material are, for example, of natural silicate origin such as diatomaceous earth or diatomite, pumice stone, or the like or natural materials processed into silicate products, primarily in granulate form. Oil-binding agents composed of organic material are composed, for example, of plastic, for example, polyurethane, polypropylene.

JP 6100284 discloses oil-absorbing granulates that are produced from an inorganic, organic binding agent containing clay and a fine powder containing a lipophilic, water-repellant material. The inorganic powder includes a mixture of sewage sludge, recovered paper material or pulverized fly ash, and clay. A mixture of sawdust, vermiculite, or pearlite with the inorganic vine powder increases its porosity. Granulate that has bound oil is sintered and stored or reused after it has been reimpregnated with lipophilic media.

A porous material used as an oil-binding agent that is derived from sawdust and a mixture of pulverized silica and clay is known from JP 57165034. After the mixture has been stirred and transferred into a desired form, after drying, it is fired at a high temperature and the fired material is subsequently treated with a waterproofing liquid.

JP 7018290 and JP 7265696 disclose oil-absorbing agents that are composed of recovered paper material to which zeolite has been attached, optionally with the aid of a bonding agent, for example, polyethylene glycol.

However, all of the known oil-binding agents listed above have the trait in common that time-consuming processes as well as the use of some relatively expensive materials are required for their production. Moreover, the aspect of using as high a proportion of waste products as possible, such as for example, sewage sludge, in the production of oil-binding agents is not satisfactorily addressed. Furthermore, the application options for the known oil-binding agents are not satisfactory, nor is the oil-binding efficiency in view of their sometimes moderate degree of porosity.

In the field of environmental protection, particularly in the case of petroleum contamination in water or soil, oil-binding agents are indispensable materials for the removal or at least the reduction of sources of contamination that may lead to oil pollution, for example. This aspect, as well as the ecological removal of waste products, is the object of applicant in the present case, along with the effort to use waste products, in order to produce oil-binding agents with extensive areas of application as well as a high oil-binding capacity using waste products.

The term "oil binder" or "oil-binding agent" is used in the following to describe binding agents for not only petroleum materials, oily products, or fluid hydrocarbons, but also chemicals.

This object is attained using a method of the type mentioned above in that, relative to the total raw mass, 35 to 60% by weight sewage sludge with a water content between 70 and 85% by weight, 25 to 55% by weight recovered paper material with a water content between 35 and 55% by weight, 10 to 25% by weight clay, and, optionally, 1 to 3% by weight zeolite, 1 to 2% by weight quicklime, and/or up to 3% by weight fly ash are mixed into a homogeneous mixture and then the raw mass thus obtained is processed into particles with an average diameter of 4 to 6 mm, whereupon the particles are dried and subsequently fired at 950 to 1010° C.

However, it is entirely possible for the proportion of sewage sludge to even fall below 35% by weight relative to the total raw mass by up to 15% by weight, such that the proportion of sewage sludge lies in the range of 20 to 60% by weight.

The advantage of the oil-binding agent produced according to the method lies on the one hand in the fact that it provides an extremely practical use for waste products and, on the other hand, an oil-binding agent is produced that fulfills all requirements, in particular oil-binding capacity and eluate properties of an oil-binding agent, for example, those of Type III according to German Standards.

The method according to the invention is further characterized in that, for the purpose of forming the mixture containing organic and mineral components, at least mineral components are used having a particle size less than 100 µm.

One embodiment of the invention lies in the use of partially drained municipal sewage sludge with a water content of approximately 70 to 85% by weight and a portion of organic material of approximately 40 to 60% by weight relative to the total dry mass. Moreover, according to the invention, a recovered paper material with a water content between 35 and 55% by weight is used, having an organic portion of approximately 70 to 90% by weight.

Provision is made according to the invention for the clay to be used in the form of powdered clay with a particle size of less than 100, in particular 60 µm.

According to one embodiment of the method, quicklime and/or fly ash is used according to the invention in a proportion corresponding to that of the recovered paper material. In any case, quicklime as well as fly ash serve as ion donors and stabilizers for the viscosity of the mixture.

According to a further feature of the method according to the invention, the clay is replaced up to 3% by weight relative to the clay portion by a lignin or lignin derivative/clay mixture preferably containing up to 10% by weight lignin or lignin derivative relative to the total portion of the premixture.

According to additional features of the method according to the invention, the raw mass is extruded to form spaghetti-like particles or the raw mass may also be subsequently processed to form pellets.

The oil-binding agents produced using the method according to the invention have a bulk density between 0.4 and 0.75 kg/l as well as an oil-binding capacity of 0.7 to 1.0 l oil per kg oil-binding agent.

The municipal sewage sludge to be used in the preparation of the mixture is partially drained to a water content of between approximately 70 and 85% by weight, determined in accordance with DIN or ÖNORM, for example, by means of a recessed-plate filter press or by centrifuging. In a first process step, the partially drained sewage sludge, the recovered paper material, and the clay, which has been ground to a particle size of less than 100 and preferably 60 µm, and zeolite, the latter two having preferably been mixed together beforehand, are mixed deeply in the amounts listed in a mixing unit to form a highly homogeneous raw mass.

Mixing may occur in batches. Addition of the components in batches and mixing or stirring of the components of the mixture in batches allow the highest degree of homogeneity in the raw mass. Evidence of the degree of homogeneity is the precise statistical distribution of the individual components in any given partial amount of the fresh raw mass, as is then used for subsequent processing.

In its finished state, the raw mass, which has the legal definition of a secondary raw material, is a stiff, pasty mass having a homogeneity predominately in the range of 10 (>100) to 100 μm (>50%).

If needed, the a lignin or lignin derivative or a mixture of a lignin or lignin derivative with bentonite may be added to the clay in weight proportions up to 3%, with the clay portion being reduced by the same amount.

The raw mass thus obtained is then either further processed with a pelletizing device for producing a granulate with a norm-compliant grain size after firing (90%<4 mm) or the raw mass may also be processed to form endless cylindrical, spaghetti-like structures using a screw extrusion press; here, extrusion occurs by means of a screen nozzle whose hole diameter is 4.5 to 5 mm and, in the course of further processing by firing and, optionally, breaking, this process also leads to a norm-compliant diameter of the granulate ultimately thus obtained with a grain size as mentioned previously.

The formation of the raw mass may also occur using brick-making processes, however; although in this case the brick-like bodies thus obtained must in each case be reduced to a granulate with a norm-compliant grain size distribution.

The processed raw mass is optionally fired after a separate preliminary drying in a furnace, for example, a rotary or tunnel furnace, in particular if the raw mass is processed using brick-making processes, with the firing temperature being approximately 950 to 1050° C. When the raw mass is fired, water and organic components of the sewage sludge and recovered paper material are volatilized. As a result, a grainy product composed of a highly porous silicate ceramic material is produced (grain size<4 mm). The product thus obtained may be supplied directly for use as an oil-binding agent.

The following should be noted with regard to the features and function of the components of the mixture:

Sewage Sludge

Depending on the process, after draining, the sewage sludge will have a water content (determined in accordance with DIN or ÖNORM) of approximately 70 to 85% by weight. In municipal sewage sludge, the proportion of organic material is approximately 40 to 60% by weight of the dry mass. As a burnout material (along with the recovered paper material), the function of the sewage sludge is to cause a corresponding degree of porosity in the oil-binding agent. The mineral portion of the sewage sludge contributes to the ceramic matrix of the oil-binding agent.

Recovered Paper Material

The recovered paper material used here has water contents of approximately 35 to 55% by weight. Its organic portion lies between approximately 70 and 90% by weight (of the dry mass). Like the sewage sludge, the recovered paper material is a burnout material and also serves as a porosity aid. Mineral portions contribute to the ceramic matrix of the oil-binding agent.

Powdered Clay

The essential function of the powdered clay is the formation of the ceramic matrix (ceramic framework) of the oil-binding agent during firing. In addition, the clay reduces pollutant mobility, in particular in the raw mass. Mineralogically, this component is essentially illitic-kaolinitic, calcite/aragonite- and dolomite-free clays of average composition.

Zeolite

Milled zeolite is used for pollutant binding (particularly heavy metals), as well as for reducing the odor of the raw mass. At the same time, it contributes to the formation of the ceramic matrix.

Quicklime and Fly Ash

These two components serve as water regulators and thus contribute to the stabilization and regulation of the viscosity of the mixture, as well as serving as ion donors.

Mineral-Organic Additive

This additive composed of a mixture of lignin and bentonite supports the formation of the ceramic structure (porosity and ceramic matrix) and contributes to the reduction in pollutant mobility, in particular of the raw mass.

As has been shown by scanning electron microscopy, the product produced by firing, by virtue of the evaporation of the water as water vapor and particularly the burnout of the organic components, represents a highly porous ceramic product usable as an oil-binding agent, having continuous open pores with pore diameters in the 1 to 100 micron range. Depending on the mixing conditions and processing methods of the raw mass, the bulk density of the oil-binding agent lies between 0.42 and 0.75 kg/l.

The grain size distribution is compliant with norms:
>4 mm<10%
0.125 to 4 mm>90%
<0.125 mm<10%

Its oil-binding capacity is between 0.7 and 1.0 l standard oil per kg oil-binding agent.

Examples of product properties of oil-binding agents produced according to the invention:

EXAMPLE 1

Oil-Binding Agent A a) Mixture composition:

| Sewage sludge, municipal, partially drained (centrifuge) | recovered paper material | powdered clay (<60 μm) | milled zeolite (<60 μm) |
|---|---|---|---|
| 56% | 28% | 15% | 1% | b) Chemical composition:

| | Results of measurement using RFA | |
|---|---|---|
| | Measurement | |
| Oxide | 1 % | 3 % |
|---|---|---|
| $TiO_2$ | 0.88 | 0.88 |
| $Al_2O_3$ | 20.9 | 20.9 |
| $Fe_2O_3$ | 8.31 | 8.29 |
| $SiO_2$ | 56.1 | 55.9 |
| MnO | 0.17 | 0.17 |

-continued

Results of measurement using RFA

| Oxide | Measurement 1 % | 3 % |
|---|---|---|
| MgO | 2.62 | 2.59 |
| CaO | 2.77 | 2.76 |
| Na$_2$O | 0.05 | 0.03 |
| K$_2$O | 3.40 | 3.42 |
| P$_2$O$_5$ | 3.57 | 3.56 |
| Cr$_2$O$_3$ | 0.036 | 0.036 |
| Total | 98.83 | 98.49 |
| Combustion loss | 0.02 | 0.02 |

Sewage sludge: Water content 81.5% by weight; organic portion of dry mass 56.7% by weight;
Recovered paper material: Water content 54.9% by weight
c) Production method: Extrusion and firing in rotary furnace
d) Mineral content of the oil-binding agent, primary components (x-ray diffractometry):
  Quartz: approximately 17% by weight;
  Hematite: approximately 8% by weight;
Feldspar (plagioclase, potash feldspar) with low crystallinity; and +/−x-amorphous, feldspar-like alumosilicate compounds and additional x-amorphous compounds
e) Oil-binding agent data:
  Bulk density: 420 g/l
  Oil-binding capacity: 1 kg oil-binding agent binds 0.700 l oil This oil-binding agent fulfills all requirements (in particular oil-binding capacity and eluate properties) of a Type III oil-binding agent in accordance with German norms.

EXAMPLE 2

Oil-Binding Agent B

Mixture composition:

| Sewage sludge, municipal, partially drained (recessed-plate filter press) | recovered paper material | clay* (<60 μm) | zeolite** (<60 μm) |
|---|---|---|---|
| 56% | 28% | 15% | 1% |

*Powdered clay;
** Milled zeolite

Sewage sludge: Water content 74.2% by weight; organic portion of dry mass 56.7% by weight;
Production method: Extrusion and firing in rotary furnace

EXAMPLE 3 a) Mixture Composition

Sewage sludge: 37.7% by weight
Recovered paper material: 47.0% by weight
Clay: 10.5% by weight
Quicklime: 1.5% by weight
Fly ash: 3.0% by weight
Lingnin: 0.3% by weight b) Oil-Binding Agent Data b1) Grain size distribution:

| Parameter | Unit | Results |
|---|---|---|
| Coarse grain portion >4 mm | % by weight | <0.1 |
| 4 mm to 0.5 mm | % by weight | 82.0 |
| 0.5 mm to 0.125 mm | % by weight | 17.8 |
| Fine grain portion <0.125 mm | % by weight | 0.2 | b2) Bulk density: 690 g/l
b3) Oil-binding capacity 1 kg oil-binding agent binds 0.997 l oil This oil-binding agent fulfills all requirements (in particular oil-binding capacity and eluate properties) of a Type III oil-binding agent in accordance with German norms.
b4) Eluate test results:

| pH value | 11 |
|---|---|
| Electrical conductivity | 600 μS/cm |
| TOC | 4.9 mg/l |
| Phenol index | <0.01 mg/l |
| Arsenic | <0.01 mg/l |
| Lead | <0.02 mg/l |
| Cadmium | <0.002 mg/l |
| Chromium-VI | <0.01 mg/l |
| Copper | 0.03 mg/l |
| Nickel | 0.013 mg/l |
| Mercury | <0.0005 mg/l |
| Zinc | 0.01 mg/l |
| Fluoride | 0.47 mg/l |
| Ammonium | <0.5 mg/l |
| Cyanide, easily purgeable | <0.01 mg/l |
| AOX | 0.033 mg/l |
| Water-soluble portion | 0.49% |

The invention claimed is:

1. A method of producing an oil-binding agent of granular, open-porous structure having a silicate-ceramic matrix by using recovered paper material and clay in the raw mixture the method comprising the steps of sequentially:
  forming a total raw mass by mixing 35 to 60% by weight sewage sludge with a water content between 70 and 85% by weight, 25 to 55% by weight recovered paper material with a water content between 35 and 55% by weight, and 10 to 25% by weight clay, into a homogeneous mixture,
  processing the raw mass thus obtained into particles with an average diameter of 4 to 6 mm, and
  drying and then firing the particles at 950 to 1010° C.

2. The method according to claim 1, further comprising the step of:
  using mineral components with a particle size less than 100 μm for forming the mixture, which includes organic and mineral components.

3. The method according to claim 1 further comprising:
  using partially drained municipal sewage sludge that has a water content of approximately 75 to 80% by weight and a portion of organic material of approximately 50 to 60% by weight, relative to the total dry mass.

4. The method according to claim 1, further comprising the step of
  using recovered paper material that has an organic portion of approximately 70 to 90% by weight relative to the total mass.

5. The method according to claim 1, further comprising the step of:
    using clay in the form of powdered clay with a particle size less than 100 µm, in particular 60 µm.

6. The method according to claim 1, further comprising the step of:
    replacing the recovered paper material in a corresponding proportion with quicklime and/or fly ash.

7. The method according to claim 1, further comprising the step of
    replacing the clay up to 3% by weight by a lignin or a premixture of a lignin derivative and clay.

8. The method according to claim 7 wherein the lignin derivative/clay premixture contains up to 10% by weight lignin or lignin derivative relative to the total proportion of the premixture.

9. The method according to claim 1, further comprising the step of
    extruding the raw mass to form cylindrical extrudates of indeterminate length.

10. The method according to claim 1, further comprising the step of:
    further processing the raw mass to form pellets.

* * * * *